United States Patent [19]
Ranner

[11] Patent Number: 4,892,154
[45] Date of Patent: Jan. 9, 1990

[54] GROUND-WORKING APPARATUS WITH ROTARY TILLER

[75] Inventor: Dietrich Ranner, Salzburg, Austria

[73] Assignee: Bombardier-Rotax-Wien Produktions- und Vertriebsgesellschaft m.b.H., Vienna, Austria

[21] Appl. No.: 165,410

[22] Filed: Feb. 29, 1988

Related U.S. Application Data

[63] Continuation of Ser. No. 827,272, Feb. 6, 1986, abandoned.

[30] Foreign Application Priority Data

Feb. 8, 1985 [AT] Austria .................................. 374/85

[51] Int. Cl.$^4$ ...................... A01B 33/02; A01B 33/16
[52] U.S. Cl. ........................................ 172/72; 37/222;
172/117; 172/112
[58] Field of Search ................... 172/199, 72, 66, 123, 172/125, 197, 117, 310, 311, 63, 112, 78; 37/222, 220, 223, 224, 197

[56] References Cited

U.S. PATENT DOCUMENTS

| | | | |
|---|---|---|---|
| 662,366 | 11/1900 | Payne | 172/549 |
| 1,585,307 | 5/1926 | Maney | 172/199 |
| 3,130,796 | 4/1964 | Rogers | 172/117 |
| 3,237,700 | 3/1966 | Hutchinson | 172/47 |
| 3,240,508 | 3/1966 | Clausen | 172/310 |
| 3,247,812 | 4/1966 | Luciano | 172/47 X |
| 3,613,802 | 10/1971 | Carlson | 172/197 |
| 3,693,722 | 9/1972 | Brown | 172/72 |
| 3,880,241 | 4/1975 | Vincent | 172/311 |
| 3,892,278 | 7/1975 | Smith et al. | 172/70 |
| 3,915,239 | 10/1975 | Henrichon | 172/146 |
| 3,990,521 | 11/1976 | Ankenman | 172/311 |
| 4,019,268 | 4/1977 | Waterman | 172/180 |
| 4,263,974 | 4/1981 | van der Lely | 172/68 |
| 4,271,911 | 6/1981 | van der Lely | 172/68 |
| 4,359,831 | 11/1982 | Beeley | 172/112 |
| 4,373,590 | 2/1983 | Wittrock | 172/123 |
| 4,520,873 | 6/1985 | Gefen | 172/123 |
| 4,523,398 | 6/1985 | Scheibel | 37/222 |
| 4,559,725 | 12/1985 | Wieland | 37/222 |

FOREIGN PATENT DOCUMENTS

| | | |
|---|---|---|
| 680918 | 2/1964 | Canada . |
| 1085214 | 9/1980 | Canada . |
| 2946796 | 5/1981 | Fed. Rep. of Germany ........ 172/72 |
| 3143408 | 10/1981 | Fed. Rep. of Germany . |
| 2167881 | 8/1973 | France . |
| 710942 | 8/1969 | Italy ................................. 172/123 |
| WO80/01467 | 10/1980 | PCT Int'l Appl. . |

Primary Examiner—Richard J. Johnson
Attorney, Agent, or Firm—Herbert Dubno

[57] ABSTRACT

A ground-working implement which comprises a rotary tiller or like ground-loosening unit and a smoothing board located behind the tiller. Both the unit and the smoothing board are subdivided generally centrally and the sections are connected by a ball and hinge joint, respectively, for the unit and the board to allow compensatory adjustment of the inclinations of the sections for varying terrains.

6 Claims, 8 Drawing Sheets

GROUND-WORKING APPARATUS WITH ROTARY TILLER

This is a continuation of co-pending application Ser. No. 827,272 filed on 6 Feb. 1986, now abandoned.

CROSS REFERENCE TO RELATED APPLICATIONS

The present application is related to the concurrently filed copending application Ser. No. 827,284 based upon Austrian application No. A 372/85 filed 8 Feb. 1985.

1. Field of the Invention

My present invention relates to a ground-working apparatus having a ground-loosening device which is horizontally elongated and rotatable about a substantially horizontal axis, e.g. a rotary tiller, and a smoothing or leveling board or blade.

2. Background of the Invention

It is known to provide a soil-working apparatus having a rotary soil-loosening unit, generally referred to as a rotary tiller, from which blades project to dig into the ground as the implement is advanced by a tractor or other towing vehicle over the ground, the smoothing board or blade being provided behind the cutter unit to serve as a leveling blade.

Implements of this type are utilized in agriculture, the tiller unit loosening the soil and the smoothing board or leveling blade thereupon leveling the soil for subsequent sowing. When a swinging mounting is provided between the coupling beam attaching the implement to the towing or carrying vehicle and the holder for the tilling unit and the blade, the implement can swing about the longitudinal axis of the coupling beam to compensate its position for changes in ground contour. The height of the tilling unit can be regulated with respect to the vehicle by the swinging of the beam up and down relative to the vehicle, e.g. by the three-point hitch. It is also possible to use such a device, when the tilling unit has been raised into an upper position, exclusively for ground tilling utilizing the leveling board or blade.

While such implements have found acceptance, by and large they have limited versatility and may not be satisfactory for all types of ground contours or for land regions which can be considered problematical.

OBJECTS OF THE INVENTION

It is, therefore, the principal object of the present invention to provide an improved ground-working implement which has significantly greater vresatility than earler implements of the type described.

A more specific object of this invention is to provide an implement for the purposes described which allows even problematical soil and ground contours to be worked with comparative ease.

SUMMARY OF THE INVENTION

These objects and others which will become apparent hereinafter are attained, in accordance with the invention, in a ground-working implement which can be of the type described in the aforementioned copending application and will have a rotating ground-loosening unit as well as a smoothing or leveling board or blade, but wherein both the ground-loosening unit and the smoothing board or blade are subdivided approximately at their middles into two sections each extending substantially over half the width of the stretch of ground worked by the machine, the sections of the ground-loosening unit being coupled together by a joint, preferably a ball joint, while the sections of the smoothing board or leveling blade are interconnected by a joint which is preferably constituted as a hinge joint lying in the longitudinal median plane of the implement or whose axis lies in this plane.

By this subdivision of the cutter unit and leveling blade and the described connection of the sections formed by subdividing them, it is possible to accommodate the orientations of both the ground-loosening unit and the smoothing board or blade to the contours of the ground and especially changing contours of the ground in spite of a wide working width of the implement which is, therefore, capable of working large fields in fewer passes than otherwise would be the case.

According to a feature of the invention, axial guidance is provided for the shaft of the ground-loosening unit in that the two sections of this unit, connected by the ball joint, is supported by springs on a support beam transverse to the travel direction of the implement. With this construction, a migration of the shaft of the soil-loosening unit in the direction of the axis is reliably prevented using relatively simple means.

To allow the implement to orient itself automatically to changing ground contours, the beam is formed as a girder with an approximately centrally positioned pivot joint and each beam section, preferably centrally is connected, preferably via a ball joint with swinging action, to a holder beam also extending transversely to the travel direction and parallel to the support.

It is especially advantageous to construct the implement so that each support beam has at its free end a drive unit and/or transmission for the rotating ground-loosening tiller, the drive unit being shiftable in the longitudinal direction of the support beam and being connected with the support beam so as to be shiftable relative thereto while being keyed to the shaft of the ground-loosening unit but fixed, i.e. axially nonshiftable, with the shaft.

Since the support beam and the ground-loosening device, depending upon the ground contours, may be swingable about different centers which accounts for the special journaling of the drive units on the support beams and their connection to the ground-loosening device a compensatory movement of the drive units with respect to the support beam is ensured. It is possible, of course, to also use drive units which are fixed to the support beam, but in this case the connection between the shaft of the ground-loosening unit and the drive means must allow for axial shiftability although the drive means here is also keyed to the shaft.

Preferably the springs which connect the two sections of the ground-loosening unit at their interconnecting joint with the support beam are constituted as curved leaf springs which extend symmetrically outwardly from the joint with respect to the transverse median plane of the implement. This ensures that the connecting line between the center of the ball joint and the pivot axis of the support beam parts will define a symmetry axis of the beam parts. The compensation for the changes in ground contour can be further ensured in accordance with the invention by providing each section of the smoothing board or leveling blade at a distance from the hinge connecting the two sections, preferably in the middle of each section, with a swinging support.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
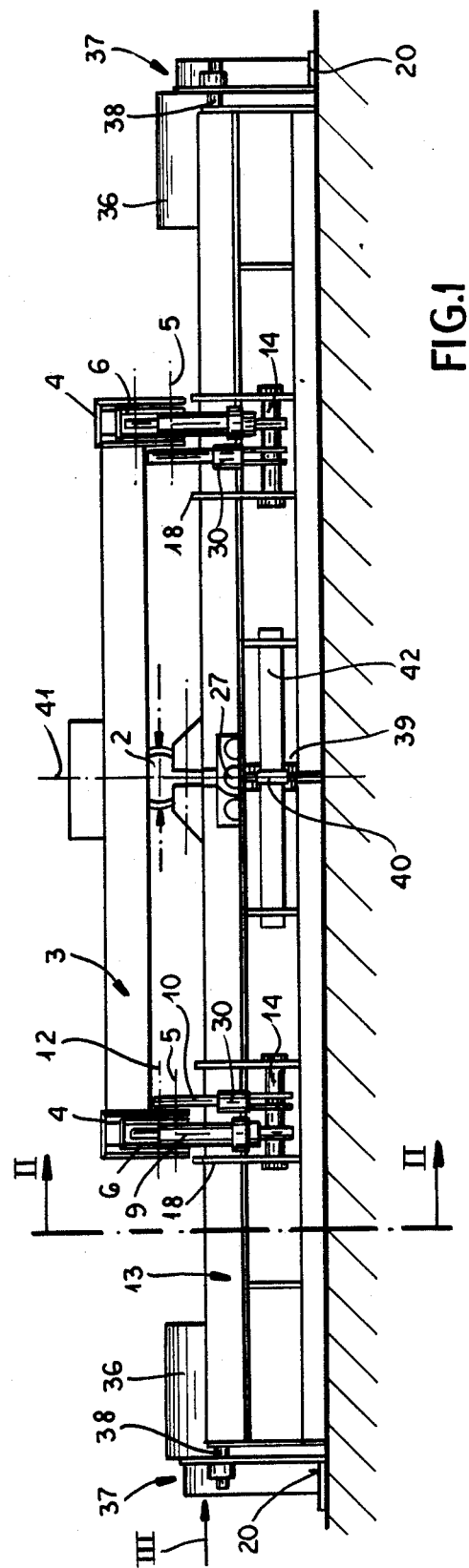
FIG. 1 is a rear elevational view of the ground-working implement of the invention.
Figure 4:
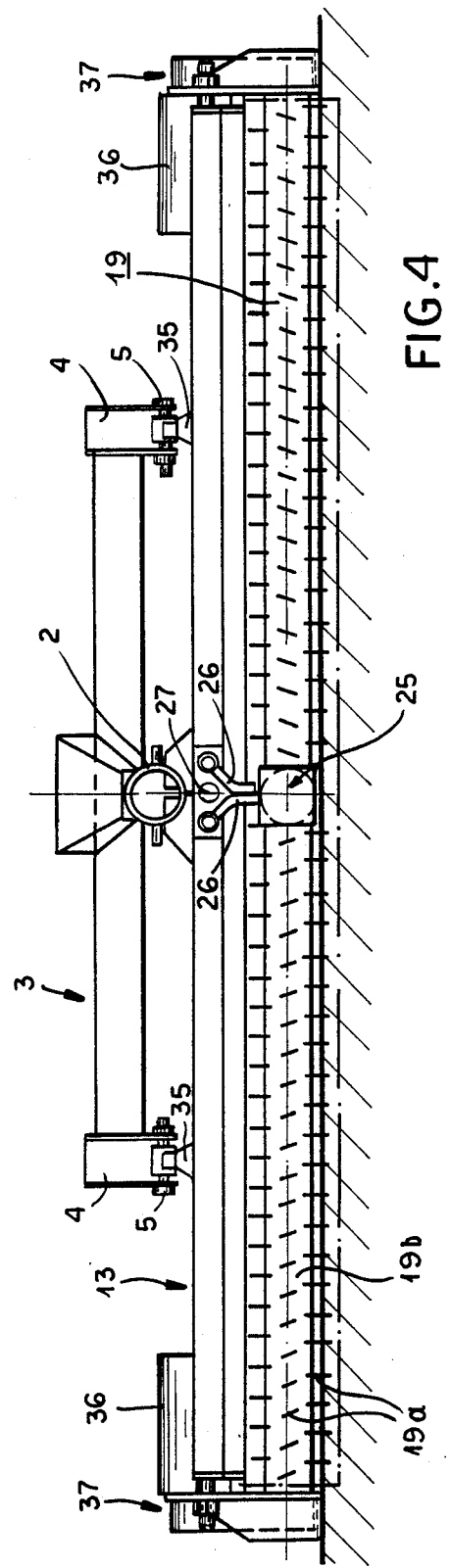
FIG. 4 is an elevational view of the implement taken in the direction of the arrow IV of FIG. 2.
Figure 2:
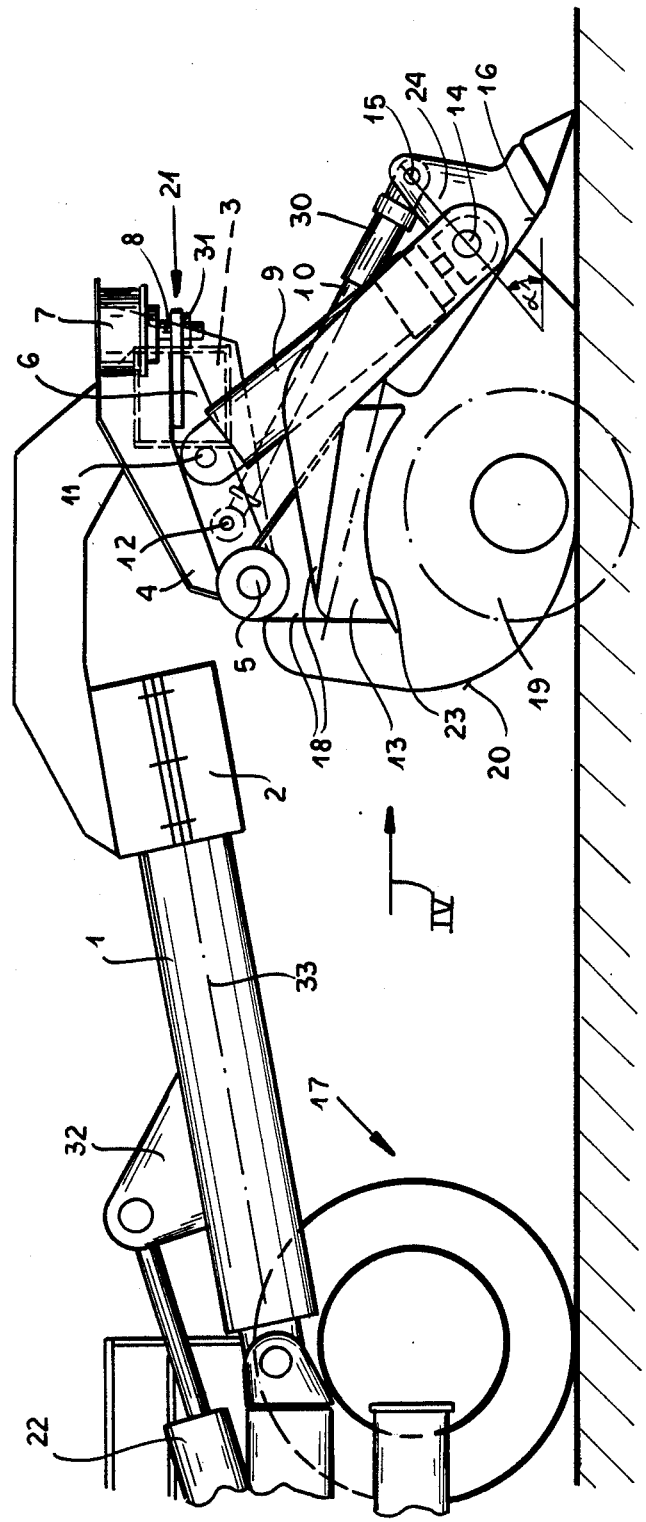
FIG. 2 is a section taken along line II—II of FIG. 1.
Figure 3:
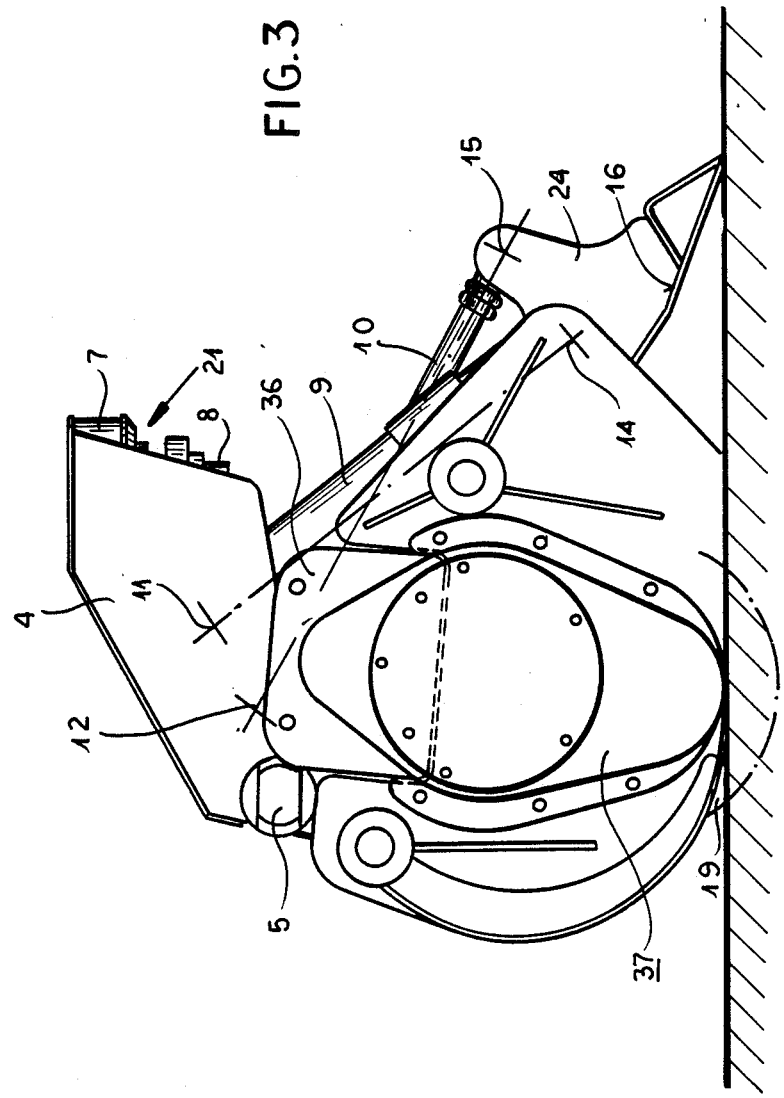
FIG. 3 is an elevational view of the implement taken in the direction of the arrow III of FIG. 1.

In FIG. 2 of the drawing I have shown at 17 a towing vehicle for the implement of the invention which can be a tractor, as illustrated, or even a tracked vehicle, e.g. when the implement of the invention is used as described in the aforementioned copending application as a ski-slope-tending implement.

The implement comprises a couping shaft 1 which is connected to the lower hinges of a hitch of the tractor 17, the upper hinge point on the shaft being formed by a lug 32 which is engaged pivotally by the piston of a piston/cylinder unit 22 serving to lift the implement or at least its cutter unit from the ground to enable, for example, the cutter unit to be brought into a travel or rest position. The cylinder of the unit 22 is swingable on the chassis of the vehicle 17.

An elastic joint 2 connects the coupling shaft 1 which a holder beam 3 to which the ground-loosening unit 19 and the smoothing board or blade 16 are connected.

The elastic joint 2 enables a swinging or pendulous movement of the holder beam 3 around the longitudinal axis 33 of the shaft 2 so that neither the ground-loosening device 19 nor the smoothing board 16 need be perfectly horizontal, but each can adjust to the inclination of the field over which the implement is displaced.

The ground-loosening unit 19 is preferably a rotary tiller as has been illustratd diagrammatically and is formed with tines 19a spaced apart on a shaft 19b.

When the implement is used for tending ski slopes, the tiller serves to break up packed ice and snow and thus to prepare the surface which is then levelled by the smoothing board to form a satisfactory skiing surface. In the latter case, the implement is preferably pulled by a tracked vehicle.

The ground-loosening device 19 is connected with the smoothing board 16 by journal bearings 14 so that the ground-loosening unit 19 can be swung about the axis of these journal bearings 14 upwardly and thus brought from its effective or working position into an ineffective or rest position. In the rest position, the ground-loosening device 19 is spaced above the ground.

The rotary tiller, forming the soil-loosening unit 19 and the smoothing or leveling board 16, are each centrally subdivided so that each consists of two elongated sections extending perpendicularly from the transverse median plane 41 of the implement which lies in the travel direction thereof.

The two sections of the rotary tiller 19 are connected by a joint 25 while the two sections of the smoothing board 16 are connected by a hinge joint 39.

The joint 25, interconnecting the two sections of the soil-loosening unit, is formed as a ball joint which interconnects the shafts of the two sections so that torque can be transmitted from one to the other and thus this ball joint can be a universal shaft joint of conventional design.

The joint 39 which interconnects the two sections of the smoothing board 16, however, is constituted as a hinge-type joint whose axis 40 lies in the transverse median plane 41 of the implement.

The two sections of the smoothing board can be spring-loaded by a leaf spring 42 which bridges the axis 41 and bears upon the two sections of the smoothing board to urge them downwardly.

For axial guidance of the shaft of the soil-loosening unit 19, the joint 25 located between the two sections thereof is supported by springs 26 on a support beam 13 running transversely to the travel direction of the implement.

The support beam 13 is preferably a girder whose pivot joint 27 is generally centrally located.

Figure 6:
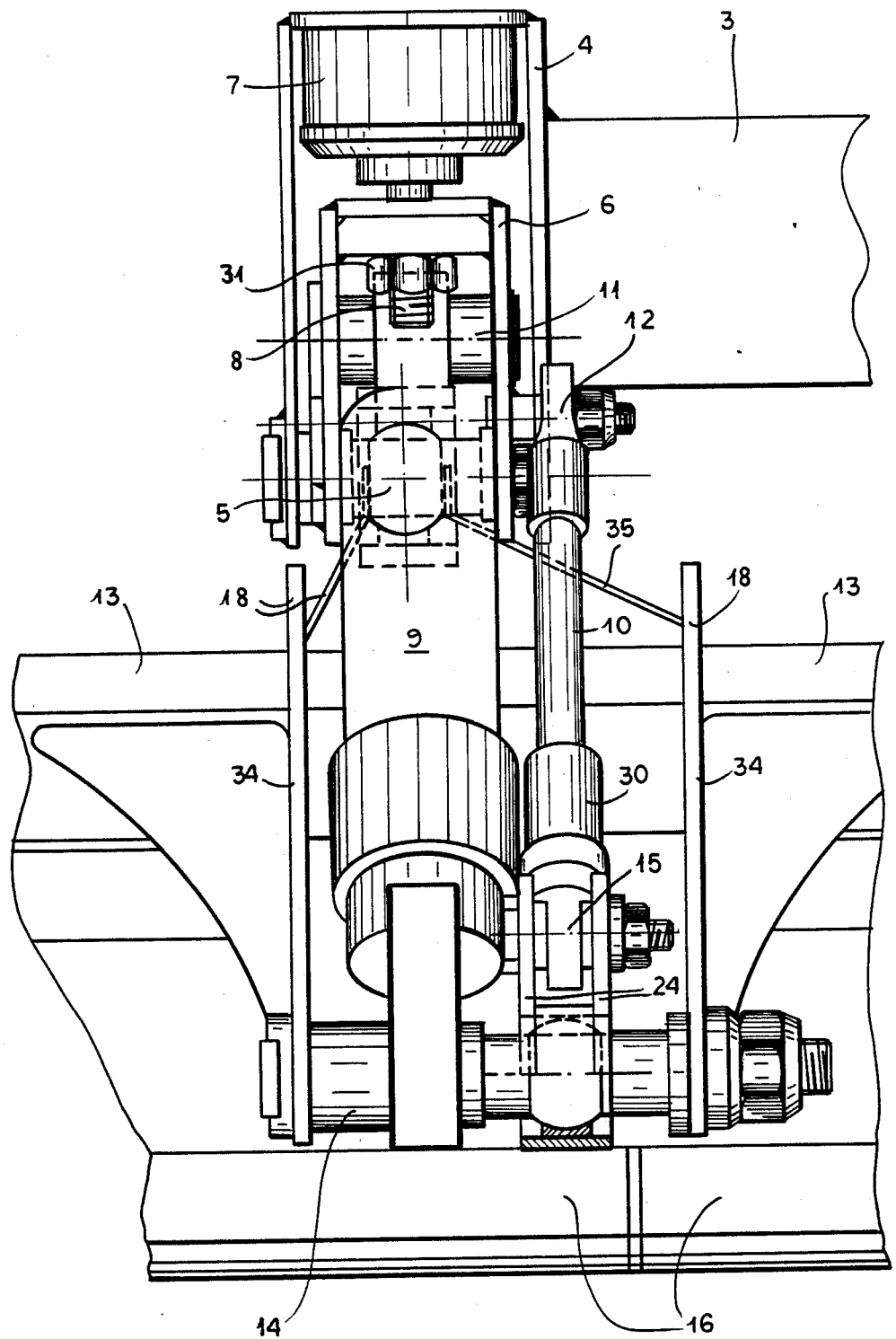
FIG. 6 is a detail of FIG. 1 drawn to a larger scale than FIG. 1.
Figure 7:
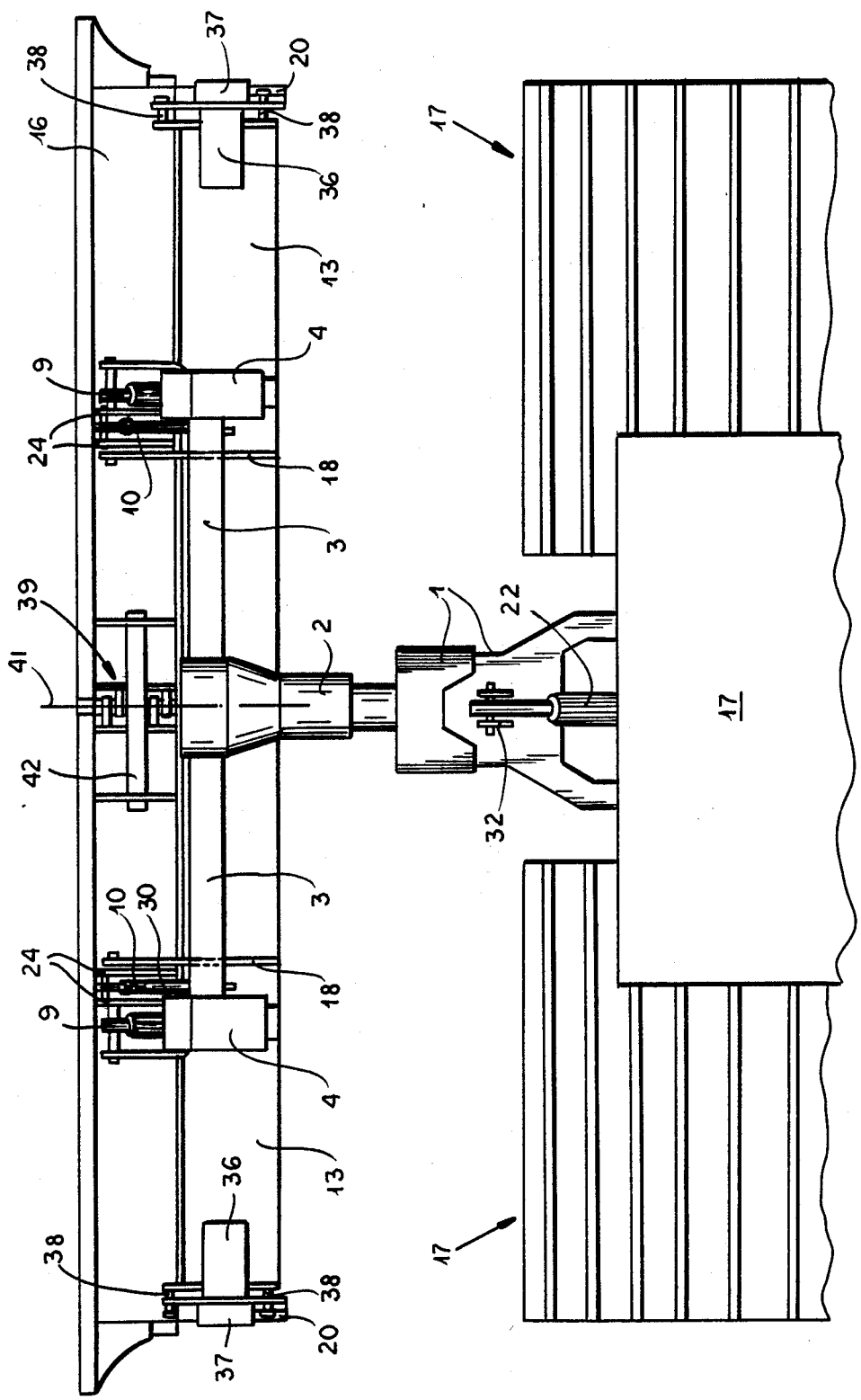
FIG. 7 is a top plan view of the implement.
Figure 8:
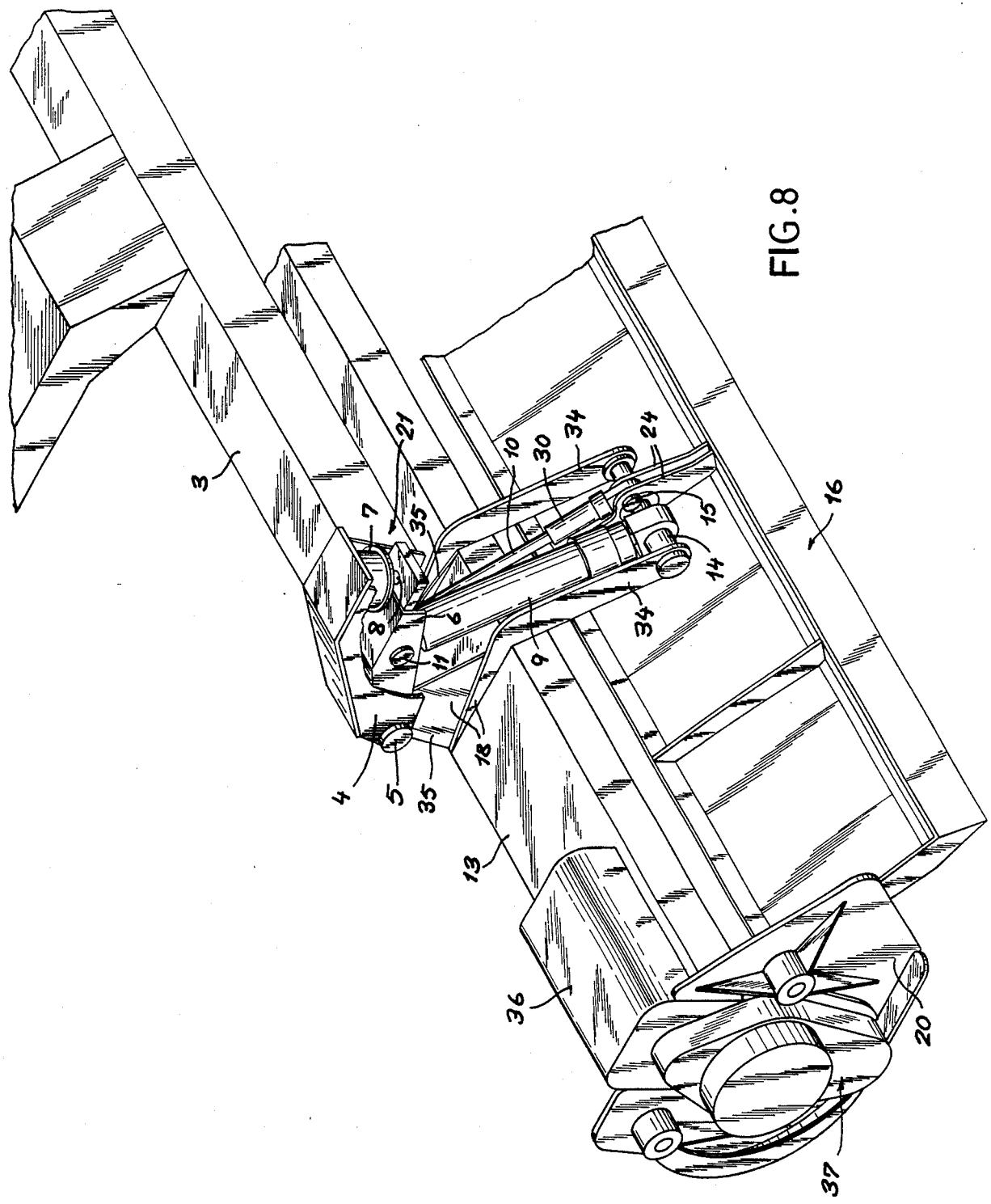
FIG. 8 is a perspective view taken from the rear of a portion of the apparatus.

Each support beam section is approximately centrally connected to the holder beam 3 by a ball joint forming a swinging or pendulous bearing 5 as can be seen from FIG. 6.

Each section of the support beam 13 carries at its free outer end a drive unit 37 for rotating the tiller 19. The drive unit 37 is thus shiftable with the beam 13 in the travel direction and is keyed to the shaft of the unit 19 so that the shaft is coupled with the drive unit 37 so that relative axial movement is not possible.

The housing of the drive unit 37 is provided with a skid 20 forming its outer surfaces so that the skids on opposite ends of the implement can provide guidance therefor.

The springs 26 are formed as curved leaf springs and extend symmetrically from the joint 25 with respect to the transverse median plane 41 of the implement.

Each section of the smoothing board 16 is suspended, at a distance from their common hinge joint 39, from a respective section of the beam 13 by a swinging bearing as can be seen from FIG. 6.

Figure 5:
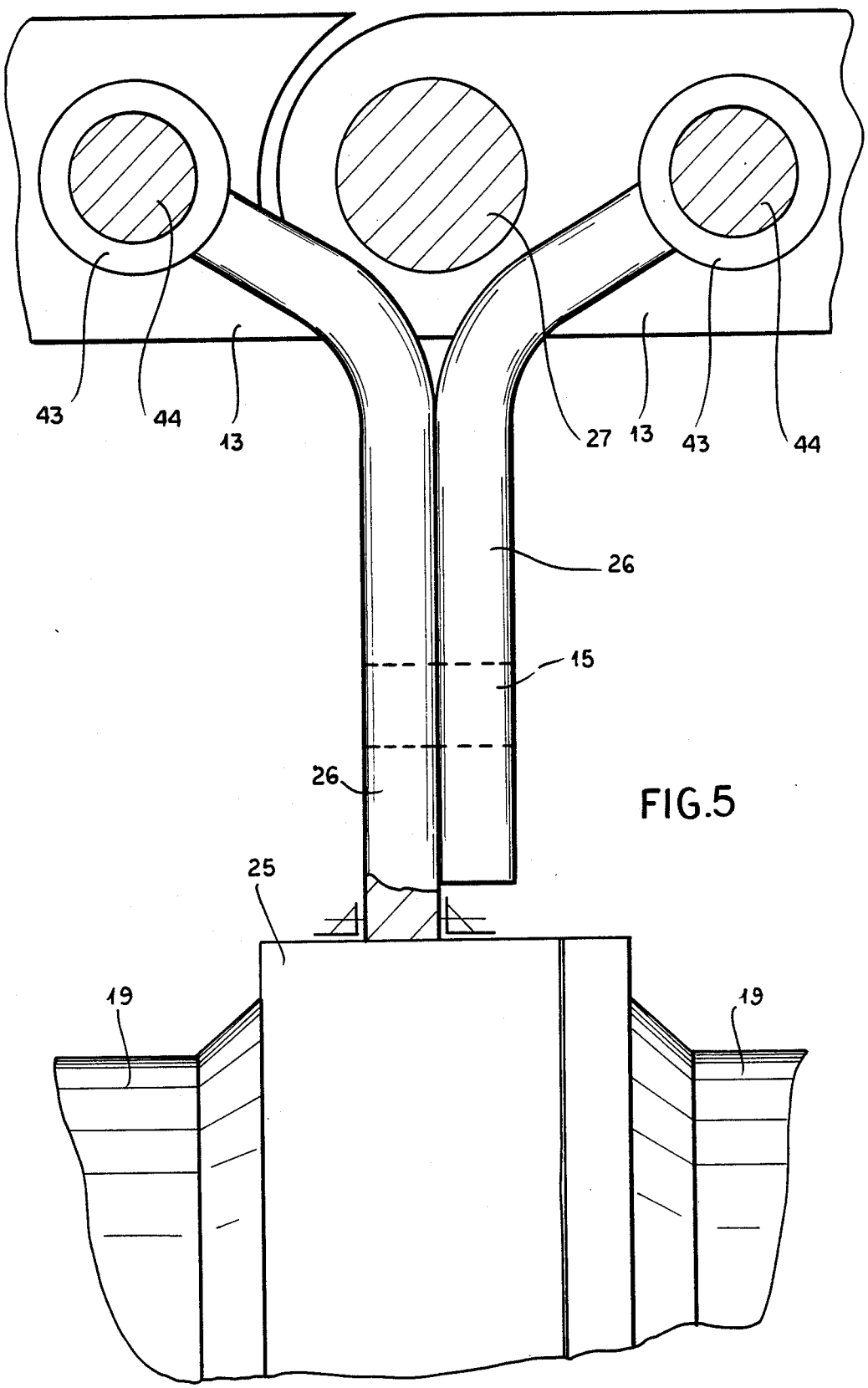
FIG. 5 is a detail of FIG. 4.

The aforedescribed arrangement of the springs 26 allows an axial guidance of the sections of the shaft of the soil-loosening unit 19 with respect to the beam 13. How the two springs 26 fullfil their purpose of limiting the axial shifting of the shaft of the soil-loosening device will be apparent from the following:

The eyes 43 of the leaf springs 26 are mounted on pins 44 of the respective sections of the beam 13, and at their convex sides the leaf springs are connected together above the joint 25. FIG. 5 shows only the bore 45 through which the connecting screw passes. One of the leaf springs is elongated in the direction of the joint 25 and is fixed thereto, preferably by welding.

The pins 44 are parallel to the joint 27 which connects the two sections of the beam 13 with one another. When the two sections of the beam 13 move relative to one another at the articulation 27, the springs 26 with respect to the sections of the beam assume a position which corresponds to the angle bisector or the symmetry line between the sections of the beam. The small change in spacing between the pins 44 resulting from the relative movements of the beam sections are compensated by the leaf springs 26 which effect an axial displacement of the shaft sections of the soil-loosening unit 19 via the joint 25.

Each section of the soil-loosening unit 19 is fixed to a longer first crank 18 of a respective four-point linkage (the aforementioned application). The crank 18 of each linkage is here provided with two ribs 34 and with respective connecting plates 35 welded to these ribs. The two connecting plates 35 of each linkage carry the main bearing 5 formed here as a swivel or self-aligning (spherical) bearing (FIG. 6).

The ribs 34 are connected to the box-girder-shaped support beam 13 extending parallel to the axis of rotation of the soil-loosening unit and which is provided on its underside with a protective hood for the rotating unit 19. The hood 23 may also be subdivided centrally.

The protective hood 23 covers the soil-loosening unit over its length and in the working position of the implement (FIG. 2) is substantially flush with or aligned with the smoothing board 16 so that the smoothing board acts as an extension of the hood and forms a part of the enclosure for the rotary tiller. Soil cast upwardly by the rotary tiller is guided rearwardly by the hood 23 against the smoothing board 16 which performs the leveling function described.

The main bearing 5 forms a journal of the four-point linkage on the holder beam 3 which also has a box-like and preferably square profile or cross section.

At each of its opposite ends, the support beam 3 has a pocket-like bracket 4 bridged by the pin traversing the main bearing 5 (FIG. 6).

A coupling 24 of each four-point linkage is fixed with the smoothing board 16 so that a coupled movement of the smoothing board is effected by the action of the four-point linkage.

A second crank 10 of each linkage has a journal bearing 15 connecting it to the smoothing board 16 and is likewise connected to the holder beam 3. The latter connection is preferably adjustable and for this adjustment a journal bearing 12 of crank 10 is fixed on a lever 6 swingable about the axis of the main bearing 5.

The lever 6 is U-shaped and the shanks of the U are swingable on the pin of the main bearing 5. The locking means for fixing the adjustment of the lever 6 is represented at 21.

The swinging of the lever 6 allows the position of the four-point linkage to be adjusted with respect to the holder beam 3. The four-point linkage is so dimensioned and mounted in the implement that within the range of swing of the four-point linkage between the working and rest positions of the implement, the position of the coupling 24 remains substantially unaltered within a tolerance limit of ±5°.

The length difference between the longer crank 18 and the shorter crank 10 should be at most 30% of the length of the longer crank, the spacing between the main and journal bearings 5 and 12 should be greater than the length of the coupling 24 between the bearings 14, 15 on the smoothing board, the bearing 14 being preferably formed as a ball joint so that the smoothing board 16 has a pendulous movement. In the working position, the coupling 24 can include an angle alpha with a parallel to the ground which ranges between 45° and 90°, but preferably is 60°. The length of the longer crank 18 is about 5 to 6 times the length of the coupling 24.

The effective length of the shorter crank 10 can be varied by a hydraulic cylinder 30 although the length-establishing unit can be a spindle drive or even a tension-locking unit with left/right threads. The hydraulic cylinder 30, which is used to provide fine control of the depth of penetration of the tiller in the soil, has the advantage that it allows this adjustment to be set by the operator from the driver's seat of the vehicle.

The device 21 for fixing the lever 6 includes a threaded spindle 8 traversing U-shaped lever 6 and upon which a nut 31 is threaded which can be braced against the lever 6. The spindle 8 is mounted on a plate which is affixed by a rubber cushion 7 to the holding beam 3, i.e. the bracket thereof.

Hydraulic motors 36 can be connected to the drive units 37 and can be supplied in parallel by a pump driven by the tractor engine.

To displace the four-point linkages, respective hydraulic cylinders 9 are provided whose pistons engage the bearings 14 of the cranks 18 and whose cylinders are articulated at 11 to the levers 6. The kinematics of the linkages is such that by extension of the cylinder 9 and retraction of the cylinder 22, the tiller 19 with the beam 13 can be raised toward the tractor or tract vehicle about the pivots 14 while the smoothing or leveling board 16 retains its original position.

I claim:
1. A ground-working implement which comprises:
   a holder comprising a beam provided with means enabling attachment of said beam to a vehicle;
   a rotary ground-loosening unit articulated to said beam and having a substantially horizontal axis extending transversely of a direction of travel of said implement; and
   a smoothing board mounted on said beam behind said unit for leveling the ground loosened by said unit, said board being generally centrally subdivided into respective sections interconnected by a joint allowing pivotal movement of the smoothing board sections relative to one another, means being provided at a central location along said ground-loosening unit between sections of said ground-loosening unit to permit independent pivoting of said sections of said ground-loosening unit with respect to one another and to said beam.

2. The ground-working implement defined in claim 1 wherein said unit comprises a girder divided into sections having a respective joint between them, a plurality of shafts mounted on each of said sections and carrying respective tiller sections having joints between them along said axis and rotatable generally about said axis, and respective springs supporting said shafts on said sections of said girder at joints between the respective tiller section.

3. The implement defined in claim 2 wherein said girder is provided on its ends with drive means operatively connected to said sections of said unit for rotating same, said drive means being shiftable relative to said girder and guided thereon while being fixed to respective shafts of said unit.

4. The implement defined in claim 2, further comprising means for pivotally connecting each section of said smoothing board at a distance from the joint interconnecting the section of said smoothing board with said beam.

5. A ground-working implement which comprises:
   a holder comprising a beam provided with means enabling attachment of said beam to a vehicle;
   a rotary ground-loosening unit articulated to said beam and having a substantially horizontal axis extending transversely of a direction of travel of said implement;

a smoothing board mounted on said beam behind said unit for leveling the ground loosened by said unit, said unit and said board each being generally centrally subdivided into respective sections interconnected by respective joints allowing pivotal movement of the smoothing board sections relative to one another and the ground-loosening unit sections relative to one another;

springs bracing the sections of said unit yieldably with respect to said beam, said unit comprising a girder having two sections and a generally centrally located joint between the girder sections and substantially midway of the beam, the respective girder sections being centrally connected by a swivel joint to said beam at said centrally located joint and to ends of said beam by further joints midway of the girder sections.

6. A ground-working implement which comprises: a holder comprising a beam provided with means enabling attachment of said beam to a vehicle;

a rotary ground-loosening unit articulated to said beam and having a substantially horizontal axis extending transversely of a direction of travel of said implement;

a smoothing board mounted on said beam behind said unit for leveling the ground loosened by said unit, said unit and said board each being generally centrally subdivided into respective sections interconnected by respective joints allowing pivotal movement of the smoothing board sections relative to one another and the ground-loosening unit sections relative to one another, said sections of said unit having respective shafts rotatable about said axis and a girder supporting said shafts, said shafts carrying respective rotatable tillers; and springs supporting said shafts on said girder, said springs being curved leaf springs extending from a respective one of said joints between said sections of said unit symmetrically with respect to a plane through said one of said joints and extending in said direction of travel.

* * * * *